US008627946B2

(12) United States Patent
Baitz et al.

(10) Patent No.: US 8,627,946 B2

(45) Date of Patent: Jan. 14, 2014

(54) DEVICE FOR DETECTING ITEMS

(75) Inventors: Guenter Baitz, Berlin (DE); Juergen Doell, Erfurt (DE)

(73) Assignee: Wincor Nixdorf International GmbH (DE)

( * ) Notice: Subject to any disclaimer, the term of this patent is extended or adjusted under 35 U.S.C. 154(b) by 17 days.

(21) Appl. No.: 13/401,243

(22) Filed: Feb. 21, 2012

(65) Prior Publication Data

US 2012/0247924 A1 Oct. 4, 2012

(30) Foreign Application Priority Data

Apr. 1, 2011 (DE) ......................... 10 2011 000 025

(51) Int. Cl.
*G06K 7/10* (2006.01)
*B65G 15/14* (2006.01)

(52) U.S. Cl.
USPC ................. 198/502.2; 198/502.1; 235/462.43

(58) Field of Classification Search
USPC ........ 198/502.1, 502.2, 502.3, 539, 572, 575, 198/577; 235/375, 435, 462.43
See application file for complete search history.

(56) References Cited

U.S. PATENT DOCUMENTS

| | | | | | |
|---|---|---|---|---|---|
| 3,485,339 | A * | 12/1969 | Miller et al. | ............... | 198/460.1 |
| 3,708,655 | A | 1/1973 | Schanne | | |
| 5,252,814 | A | 10/1993 | Tooley | | |
| 5,505,291 | A * | 4/1996 | Huang et al. | ............... | 198/460.3 |
| 5,543,607 | A | 8/1996 | Watanabe et al. | | |
| 6,142,376 | A | 11/2000 | Cherry et al. | | |
| 6,431,450 | B1 * | 8/2002 | Lundahl et al. | .......... | 235/462.43 |
| 6,739,446 | B2 * | 5/2004 | Niemela et al. | ............ | 198/502.2 |
| 6,812,426 | B1 * | 11/2004 | Kotowski et al. | ............. | 209/589 |
| D536,192 | S | 2/2007 | Kruse et al. | | |
| 7,387,241 | B2 | 6/2008 | Hassenbuerger | | |
| 7,407,056 | B2 | 8/2008 | Lutz | | |
| 8,074,785 | B2 | 12/2011 | Twiste | | |
| 8,201,681 | B2 * | 6/2012 | Schiesser et al. | .......... | 198/460.1 |
| 2006/0266824 | A1 | 11/2006 | Hassenbuerger | | |
| 2006/0283943 | A1 | 12/2006 | Ostrowski et al. | | |
| 2008/0110724 | A1 | 5/2008 | Twiste | | |
| 2009/0039164 | A1 | 2/2009 | Herwig et al. | | |
| 2010/0072220 | A1 | 3/2010 | Michels | | |
| 2010/0258381 | A1 | 10/2010 | Baitz et al. | | |
| 2012/0018520 | A1 | 1/2012 | Twiste | | |

FOREIGN PATENT DOCUMENTS

| | | |
|---|---|---|
| DE | 2264518 | 5/1972 |
| DE | 10141429 | 8/2001 |
| DE | 202 06 878 | 4/2002 |
| DE | 102 35 865 | 8/2002 |
| DE | 101 41 429 | 1/2003 |
| DE | 20 2005 007 089 | 5/2005 |
| DE | 20 2004 021 433 | 3/2008 |
| DE | 20 2008 012 862 | 9/2008 |
| DE | 10 2008 044 795 | 3/2010 |

* cited by examiner

*Primary Examiner* — Douglas Hess

(74) *Attorney, Agent, or Firm* — Harness, Dickey & Pierce, P.L.C.

(57) ABSTRACT

The invention relates to a device for detecting items with a transport device having two belt conveyors arranged one behind the other for transporting items in a transport direction, wherein a slot is configured between the belt conveyors perpendicular to the transport direction, and with a scanning unit for the contactless optical scanning through the slot of a contact surface of the items being transported on the transport device, where the slot is covered at least partially by a protective rail and is arranged spaced apart from the belt conveyors.

20 Claims, 2 Drawing Sheets

DEVICE FOR DETECTING ITEMS

CROSS REFERENCE TO RELATED APPLICATIONS

This application claims the benefit and priority of German Patent Application No. 102011000025.9 filed Apr. 1, 2011. The entire disclosure of the above application is incorporated herein by reference.

BACKGROUND OF THE INVENTION

1. Field of the Invention

The invention relates to a device for detecting items having a transport device with two belt conveyors arranged one behind the other for transporting the items in a transport direction, wherein a slot is configured perpendicular to the transport direction between the belt conveyors, and having a scanning unit for contactless optical scanning through the slot of a contact surface of the items being transported.

2. Discussion

Such a device is known from DE 101 41 429 C1. The device is used, for example, in self-service cash register systems in shopping centers or similar and serves for the automated detection of items, in particular the detection of a marking identifying the items (barcode or similar) by means of an optical scanning unit. The optical scanning unit is arranged between two belt conveyors arranged one behind the other in a transport direction. The belt conveyors are positioned spaced apart from each other in such a way that a slot is formed between said belts extending perpendicular to the transport direction through which the scanning unit optically scans one contact surface of the items, on which the items are being transported, as they pass from the rear belt conveyor, as viewed in the transport direction, onto the front belt conveyor, as viewed in the transport direction. The remaining outer sides of the items are optically recorded, for example, by means of further scanning units so that the items can be identified safely and reliably, regardless of their orientation on the belt conveyors. The additional scanning units can be attached to an archway-shaped carrier arranged above the belt conveyors to form what is known as a tunnel scanner.

The scanning unit assigned to the slot is fixed in position to the belt conveyors, as are the additional scanning units, which can be provided as an option. The scanning unit typically contains a source for emitting optical radiation and a detector for receiving the radiation reflected from the items being transported on the belt conveyors. Usually the radiation involves wavelengths in the range of visible or UV light.

Although the device has basically proved itself, items can fall into the slot formed between the belt conveyors as they are being passed from the first belt conveyor to the second belt conveyor, with the result that the recording process has to be interrupted. In addition, in exceptional instances the items, or their packaging, can be damaged as said items are being passed from one belt conveyor to the next.

SUMMARY OF THE INVENTION

The object of the present invention is, therefore, to continue development of the device in such manner that reliability is increased and damage to the items is prevented.

To achieve this object the device is preferably characterized in that the slot is at least partially covered by a protective rail which extends perpendicular to the transport device and is arranged spaced apart from the belt conveyors.

The particular advantage of the invention is that items are transferred particularly reliably from one belt conveyor to the other because the protective rail is provided, partially covering the slot formed between the belt conveyors. The protective rail prevents items from falling into the slot and, at the same time, and acts as a carrier or support for the items in the vertical direction. The protective rail preferably covers a great part of the slot so that only a functionally necessary narrow gap for the optical scanning and/or a functional gap is formed on both sides of the protective rail between the protective rail and the moving belt conveyors. The functional gap ensures that there is no contact between the belt conveyors and the protective rail, and consequently there is no damage to the belt conveyors or the protective rail, respectively.

The belt conveyors are configured, for example, as endless belts, where the items are transported on the upper slack side of the endless belts in the transport direction.

In accordance with a preferred embodiment of the invention, the protective rail has an extended recess oriented perpendicular to the transport direction. The contact side of the items is scanned through the recess by means of the scanning unit. The gap between the two belt conveyors can advantageously be covered by providing the extended recess.

By providing the extended recess, the gap between the two belt conveyors can advantageously be covered by a single protective rail. The recess, which defines the scanning gap, can, for example, be provided in the center both in the protective rail and in the middle between the two belt conveyors. This ensures that by using a centrally located scanning unit in the slot, the contact side can be scanned at a favorable scanning angle. Scanning preferably takes place at a 90° angle to the contact side of the items.

In accordance with a further development of the invention, the protective rail can be moved, specifically it can be pivoted about a longitudinal direction of the protective rail relative to the belt conveyors. Specific provision can be made for the protective rail to be raised as the items enter the slot, that is to say it is distanced from the belt conveyors. The items themselves entering the slot can raise the rail in the process. Through the moveable arrangement of the protective rail, damage to the items or the packaging itself is advantageously prevented if the items find themselves in the scanning gap or one of the two functional gaps as they are passed from the first belt conveyor to the second belt. This can be the case, for example, if very flat objects, newspapers or individual pages of magazines, are conveyed on the belt conveyor.

In accordance with a further development of the invention, at least one sensor is assigned to the protective rail for recording items that enter the slot formed between the belt conveyors. By providing a suitable sensor system, items entering the slot can advantageously be recorded automatically. This is of great advantage, for example, in self-service cash register systems that are operated by untrained personnel and that essentially record items automatically that are placed on the belt conveyor by customers. For example, an optical sensor (light curtain) can be provided as a sensor. It is similarly possible to assign a force sensor to the protective rail that detects an increase in force that is the consequence of items entering the scanning gap or a functional gap. A motion sensor can similarly be assigned to the moveably mounted protective rail.

In accordance with a further development of the invention, a control unit is provided that cooperates with a drive unit driving the belt conveyors. By providing the control unit, the belt conveyors can advantageously be stopped when items enter the slot. On the one part, by stopping the belt conveyors, further damage to the items or the packaging that are protruding at least partially into the slot can be prevented. On the other part, the opportunity is created during the downtime to remove the items that ended up in the slot from said slot.

In accordance with a further development of the invention, the belt conveyors are arranged offset in height to each other, where the front belt conveyor, as viewed in the transport direction, is arranged below the rear belt conveyor, as viewed in the transport direction. One surface of the protective rail is arranged inclined in the area of the slot to connect the contact surfaces of the belt conveyors. As a result of this inclined arrangement of the protective rail and the vertical offset of the belt conveyors, the transfer of the items from the first belt conveyor to the second belt conveyor is simplified. The protective rail acts here as a type of a slide for the items. In addition, a speed for the belt conveyors can be selected such that the items specifically "shoot" over the functional gap formed between the first belt conveyor and the protective rail. As a result, the risk of the items ending up in the functional gap is reduced.

In accordance with a further development of the invention, the belt conveyors, the protective rail and the scanning unit assigned to the protective rail or the slot covered by the protective rail are attached to a common carrier component. By providing a common carrier component precise positioning of the individual functional components (belt conveyors, protective rail, scanning unit) to each other is advantageously ensured, with the result that the items can be optically scanned particularly reliably and safely. Adjustment means can be provided on the carrier component or the functional components for a one-time adjustment and locking of the position of the functional components to each other when the system is installed and operation commences. For example, elongated holes can be provided in the carrier component. As an option, additional functional components can be attached on the device, for example the additional scanning units, by means of which the additional outer sides of the items are scanned optically. In this case, this scanning unit assigned to the slot in its position and relative position is positioned to the belt conveyors and the protective rail.

Additional advantages of the invention become clear from the dependent claims.

BRIEF DESCRIPTION OF THE DRAWINGS

One embodiment of the invention is explained in more detail hereinafter using the Figures.

DETAILED DESCRIPTION OF THE PREFERRED EMBODIMENTS

Figure 1:
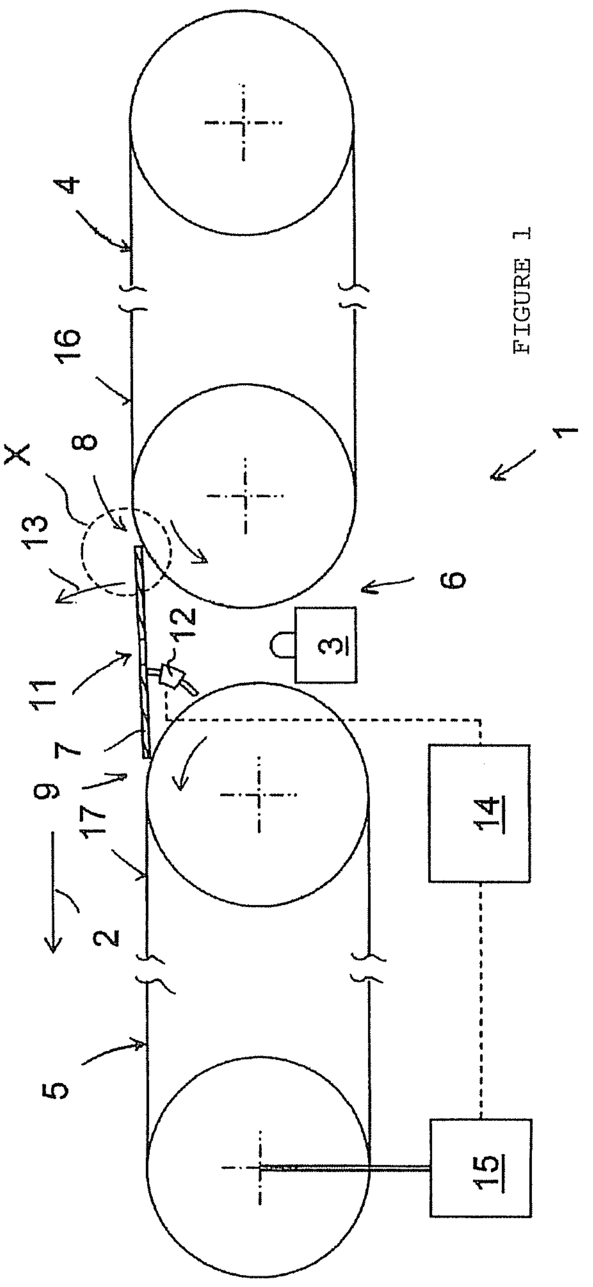
FIG. 1 shows an illustration in a side view of the principle of the device in accordance with the invention showing a protective rail.

A device in accordance with the invention in FIG. 1 shows a transport device 1 for transporting items in a transport direction 2 and a scanning unit 3 for the contactless optical scanning of a contact surface of the items transported on the transport device 1. The transport device 1 comprises two belt conveyors 4, 5 arranged one behind the other in the transport direction 2, spaced apart from each other in the transport direction 2. By virtue of the spaced apart arrangement of the belt conveyors 4, 5, a slot 6 is formed extending perpendicular to the transport direction 2 between the belt conveyors 4, 5. The contact side of the items can be scanned through the slot 6 by means of the scanning unit 3 as the items are transferred from the rear belt conveyor 4, as viewed in the transport direction, to the front belt conveyor 5, as viewed in the transport direction 2.

The slot 6 is partially covered by a protective rail 7 that extends perpendicular to the transport direction 2 and is arranged spaced apart from the belt conveyors 4, 5 in such a manner that a first functional gap 8 is formed between the functional rail 7 and the rear belt conveyor 4, and a second functional gap 9 is formed between the front belt conveyor 5 and the protective rail 7. The protective rail 7 has in addition a recess 11 extending in a longitudinal direction 10 of the protective rail 7. The longitudinal direction 10 of the protective rail 7 is oriented perpendicular to the transport direction 2 of the transport device 1. Scanning the contact side of the items is carried out by means of the scanning unit 3 through the recess 11 in the protective rail 7, which acts as a scanning gap.

The protective rail 7 is arranged moveably relative to the transport rails 4, 5 in accordance with the embodiment of the invention shown. For this purpose, the protective rail 7 is attached by means of a connecting unit 12 to a component of the device, not shown in FIG. 1, that is fixed in position. The connecting unit 12 is configured such that the protective rail 7 can be pivoted in a pivoting direction 13 around the longitudinal direction 10 of said rail. A travel sensor, not shown, is additionally assigned to the connecting unit 12 to record the position or the pivot angle of the protective rail 7. The sensor is connected to a control unit 14. The control unit 14 in turn is connected to a scanning unit 15 to drive the transport device 1. Over connecting means, not shown, the scanning unit 15 drives both the first belt conveyor 4 and the directly driven second belt conveyor 5.

Figure 2:
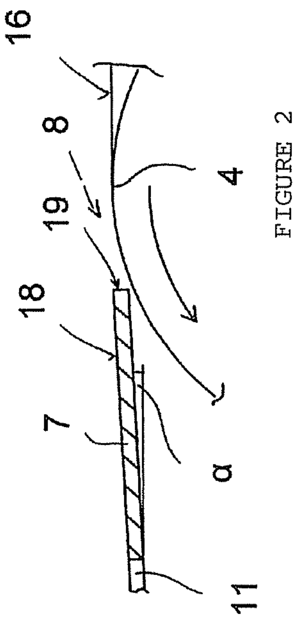
FIG. 2 shows an enlargement of the area X from FIG. 1.

As can be seen from the enlarged, detailed illustration from FIG. 2, the protective rail extending between the first belt conveyor 4 and the second belt conveyor 5 in the initial configuration shown is inclined from the horizontal at an angle $\alpha$. The inclined arrangement of the protective rail 7 acts to connect contact surfaces 16, 17 of the belt conveyors 4, 5 to each other and to compensate for a vertical offset of belt conveyors 4, 5 in the transport direction 2. Contact surface 16 is formed by the slack side of rear belt conveyor 4 and contact surface 17 is formed by the slack side of front belt conveyor 5.

Since the contact surface 16 of the first belt conveyor 4 is arranged above the contact surface 17 of the second belt conveyor 5, the items being transported in transport direction 2 can be transferred automatically from first belt conveyor 4 to second belt conveyor 5 along protective rail 7. Protective rail 7 has an upper side 18 that supports the items vertically in the manner of a slide during the transfer.

Slot 6 between first belt conveyor 4 and second belt conveyor 5 is between 10 mm and 20 mm wide at its narrowest point. Protective rail 7 covering slot 6 is, for example, 28 mm wide, where recess 11, which acts as scanning slot, can be 6 mm in width, as an example. In the initial configuration, for example, the angle $\alpha$ is 5°. The vertical offset between first belt conveyor 4 and second belt conveyor 5 is 2.3 mm, for example. Functional slots 8, 9, which are formed to prevent protective rail 7 from contacting rotating belt conveyors 4, 5, are, as an example, 1 mm or less in width in the initial configuration shown.

In order to scan the contact side of the items, the item is conveyed on first belt conveyor 4 in transport direction 2. When the items reach the area of gap 6, they slide over the surface 18 of protective rail 7 and reach second belt conveyor 5, from which they are transported further in transport direction 2. As they slide past protective rail 7, the contact surface of the items is optically scanned through the scanning gap (recess 11).

In an exceptional case, an item can be deposited partially or completely in the first functional gap 8 or the scanning gap (recess 11) as it leaves first belt conveyor 4. For example, it is possible for a magazine or individual pages of the magazine to pass through first functional gap 8 into slot 6. In this case, protective rail 7 is pivoted up in direction 13 by the item that has been deposited in first functional slot 8. As a result of this upward pivoting motion, damage to the item or its packaging is prevented since protective rail 7 is configured to be somewhat yielding and the width of functional slot 8 is enlarged when the item enters.

The raising of protective rail 7 is detected by through the sensor, not shown, assigned to connecting unit 12. The sensor is configured as a displacement sensor, for example. The displacement signal is transmitted by the sensor, not shown, to control unit 14. Control unit 14 cooperates in such a manner with drive unit 15 of transport device 1 that, when items enter gap 6 and with the resultant pivoting of protective rail 7, belt conveyors 4, 5 are stopped. Stopping belt conveyors 4, 5 firstly ensures that the item is not transported further into gap 6 and/or damaged. Secondly, that items that have reached slot 6 can be retrieved without danger from slot 6 while belt conveyors 4, 5 are stationary. As a result, damage to the device and a resultant long downtime of said device are effectively prevented.

Second functional slot 9 is to be considered non-critical because of the transport direction 2 of second belt conveyor 5, since items that have reached second functional gap 9 are conveyed automatically from said gap as a result of the transport movement.

Naturally, end faces 19 of the protective rail 7 facing belt conveyors 4, 5 can have a profiled configuration configured and adapted to the surface geometry of belt conveyor 4, 5 to achieve a particularly small gap dimension.

The sensor does not have to be arranged on principle integral with connecting unit 12. For example, a suitable force sensor and/or an optical sensor can be provided in place of a displacement sensor for detecting items that have reached gap 6.

Instead of pivoting protective rails 7, linear motion is also possible, where regardless of whether protective rail 7 is pivoted or moved in a linear manner, protective rail 7 is moved away from belt conveyors 4, 5 when the items enter gap 6 and functional gap 8 becomes larger.

Figure 3:
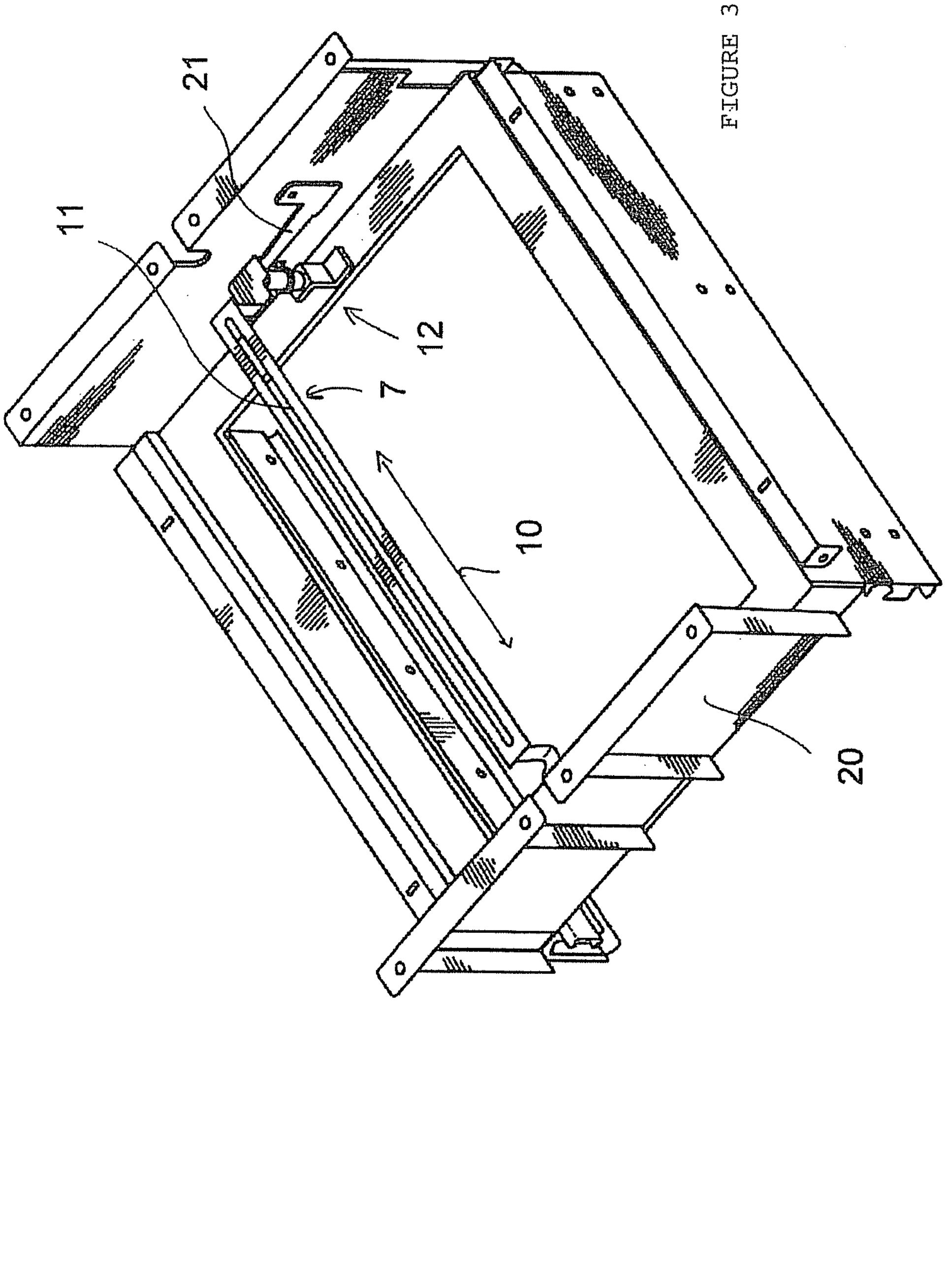
FIG. 3 shows a perspective of the protective rail held moveably on a carrier component.

FIG. 3 shows a perspective view of a component carrier 20 to which protective rail 7 is retained pivotable along its longitudinal direction 10. Protective rail 7 is supported for this purpose over a pivot arm 21 against the frame-shaped, closed carrier component 20. Pivot arm 21 in turn is supported over connecting unit 12, which has the integral sensor, not shown, against the carrier component 20.

Carrier component 20 serves, in addition to the moveable mounting of protective rail 7, to attach scanning unit 3. In addition, transport device 1 is attached to carrier component 20. This ensures that protective rail 7, scanning unit 3, and transport device 1 have a defined location to each other. This defined position of the components to each other improves detection accuracy. Carrier component 20 is in turn attached to a frame, not shown, of the detection device.

In accordance with an alternative embodiment of the invention, not shown, the protective rail 7 may be arranged fixed in position and specifically not be pivotable. In this case, a force sensor is preferably assigned to protective rail 7, by means of which the entry of items into gap 6 can be detected. Inasmuch as items reach gap 6, drive unit 15 is actuated in a known way by controls 14 and belt conveyors 4, 5 are brought to a halt.

Identical components and component functions are assigned the same reference numerals.

What is claimed is:

1. A device for detecting items comprising a transport device having two belt conveyors arranged one behind the other for transporting items in a transport direction, where a slot is configured between the belt conveyors extending perpendicular to the transport direction, and having a scanning unit for contactless optical scanning through the slot of a contact surface of the items being transported on the transport device, wherein the slot is covered at least partially by a movable protective rail that extends perpendicular to the transport direction and is arranged spaced apart from the belt conveyors.

2. The device from claim 1, wherein the protective rail has an extended recess oriented perpendicular to the transport direction through which the contact surface of the items can be scanned.

3. The device from claim 1, wherein the protective rail is retained moveably relative to the transport direction.

4. The device from claim 1, wherein the protective rail is retained pivotably about the longitudinal direction of said rail.

5. The device from claim 1, wherein at least one sensor is assigned to the protective rail for detecting items entering the slot formed between the belt conveyors.

6. The device from claim 1, wherein a control unit is provided that cooperates with the at least one sensor and a drive unit driving the belt conveyors, for bringing the belt conveyors to a halt when items enter the slot.

7. The device from claim 1, wherein contact surfaces of the belt conveyors are arranged vertically offset to each other in such manner that the front belt conveyor, as viewed in the transport direction, is arranged below the rear belt conveyor, as viewed in the direction.

8. The device from claim 1, wherein one surface of the protective rail is arranged inclined to connect the contact surfaces of the belt conveyors in the area of the slot.

9. The device from claim 1, wherein the belt conveyors, the protective rail, and the scanning unit are attached to a common carrier component.

10. The device from claim 1, wherein the carrier component is configured as a closed, frame-shaped carrier component.

11. A transportation device comprising:

a rear belt conveyor;

a front belt conveyor spaced apart from the rear belt conveyor, the rear and front belt conveyors are configured to transport items in a transport direction;

a scanning device between the rear and front belt conveyors, the scanning device configured to optically scan items transported by the rear and front belt conveyors;

a protective rail movably mounted between the rear belt conveyor and the front belt conveyor, the protective rail extends in a direction perpendicular to the transport direction; and a slot defined by the protective rail, the slot extends perpendicular to the transport direction and is configured to permit the scanning device to scan items through the protective rail.

12. The transportation device of claim 11, wherein the protective rail is pivotable about an axis that is perpendicular to the transport direction.

13. The transportation device of claim 11, wherein the protective rail is slidable along an axis that is perpendicular to the transport direction.

14. The transportation device of claim 11, further comprising a sensor configured to detect movement of the protective rail.

15. The transportation device of claim 11, further comprising a control unit configured to stop the rear and front belt conveyors in response to movement of the protective rail.

16. The transportation device of claim 11, wherein a rear transportation surface of the rear belt conveyor is vertically above a front transportation surface of the front belt conveyor.

17. The transportation device of claim 11, wherein the protective rail is vertically inclined from the front belt conveyor to the rear belt conveyor.

18. A transportation device comprising:

a rear belt conveyor;

a front belt conveyor spaced apart from the rear belt conveyor, the rear and front belt conveyors are configured to transport items in a transport direction;

a scanning device between the rear and front belt conveyors, the scanning device configured to optically scan items transported by the rear and front belt conveyors;

a protective rail movably mounted between the rear belt conveyor and the front belt conveyor, the protective rail extends in a direction perpendicular to the transport direction, the protective rail is at least one of pivotable and slidable about a longitudinal axis extending perpendicular to the transport direction;

a slot defined by the protective rail, the slot extends perpendicular to the transport direction and is configured to permit the scanning device to scan items on a side of the protective rail opposite to the scanning device; and a control unit configured to stop the rear and front belt conveyors in response to movement of the protective rail.

19. The transportation device of claim 18, wherein a rear transportation surface of the rear belt conveyor is vertically above a front transportation surface of the front belt conveyor.

20. The transportation device of claim 18, wherein the protective rail is vertically inclined from the front belt conveyor to the rear belt conveyor.

* * * * *